(12) United States Patent
Reddy et al.

(10) Patent No.: US 7,062,542 B1
(45) Date of Patent: Jun. 13, 2006

(54) LOCAL AND REMOTE CLIENT-SERVER INTERFACE TRANSPARENCY IN DISTRIBUTED SOFTWARE SYSTEMS

(75) Inventors: Venugopal P. Reddy, Madison, NJ (US); Andriy M. Bihun, Pine Bush, NY (US)

(73) Assignee: i2 Technologies US, Inc., Dallas, TX (US)

( * ) Notice: Subject to any disclaimer, the term of this patent is extended or adjusted under 35 U.S.C. 154(b) by 770 days.

(21) Appl. No.: 09/834,802

(22) Filed: Apr. 12, 2001

Related U.S. Application Data

(60) Provisional application No. 60/261,445, filed on Jan. 12, 2001.

(51) Int. Cl.
*G06F 15/16* (2006.01)

(52) U.S. Cl. ............ 709/219; 709/246; 709/223; 709/203; 709/316; 707/103

(58) Field of Classification Search ........... 709/219, 709/246, 223, 203, 316; 707/103
See application file for complete search history.

(56) References Cited

U.S. PATENT DOCUMENTS

| | | | |
|---|---|---|---|
| 6,457,049 B1 * | 9/2002 | Lewis et al. | 709/223 |
| 6,473,805 B1 * | 10/2002 | Lewis | 709/246 |
| 6,629,128 B1 * | 9/2003 | Glass | 709/203 |
| 6,691,148 B1 * | 2/2004 | Zinky et al. | 709/201 |

* cited by examiner

*Primary Examiner*—Anthony Knight
*Assistant Examiner*—Sunray Chang
(74) *Attorney, Agent, or Firm*—Steven J. Laureanti; James E. Walton

(57) ABSTRACT

A distributed software system (10) includes at least one server component (22) that supports one or more server objects having associated data and at least one client component (24) that is distributed from the server component (22). The client component (24) accesses data associated with one or more of the server objects according to a scheme making it substantially transparent to the client component (24) whether the server component (22) is local to or remote from the client component (24).

22 Claims, 4 Drawing Sheets

LOCAL AND REMOTE CLIENT-SERVER INTERFACE TRANSPARENCY IN DISTRIBUTED SOFTWARE SYSTEMS

RELATED APPLICATIONS

This application claims the benefit under 35 U.S.C. § 119(e) of U.S. Provisional Application Ser. No. 60/261,445 filed Jan. 12, 2001 entitled "Local and Remote Interface Transparency in Distributed Software Systems."

TECHNICAL FIELD OF THE INVENTION

The present invention relates to computer software and systems, and more specifically to local and remote client-server interface transparency in distributed software systems.

BACKGROUND OF THE INVENTION

Component-based, distributed software systems continue to increase in popularity. Components are blocks of functionality with published interfaces, and in some architectures may be considered fundamental units of distributed deployment. Components might be, for example, dynamically loaded modules (for example, .dll files) within containers such as executables (for example, .exe files in a Microsoft Windows-based system). In a distributed computing environment, if a component provides another component with access to an internal data model, the components may assume the roles of server and client within the context of that data access. A particular component may be a server in one context and a client in another. A server-client component pair may be local, both components being within a single container, or remote, the components being within different containers. Often, remote component pairs are separated by a network.

Techniques used for optimizing performance in component-based, distributed software systems are typically different depending upon whether the components in a component pair are local or remote. To achieve acceptable performance optimization, it is generally necessary to implement at least two sets of code for each component—one set of code to be used when the client-server relationship is local and the other set of code to be used when the client-server relationship is remote. When a client-server relationship is established between two components, the components must determine whether the relationship is local or remote and then execute the corresponding code. Furthermore, a component that may act as a client with respect to multiple types of server components must typically have two sets of code for each such server component. Such requirements add complexity and cost to the component development process, while potentially decreasing reliability.

SUMMARY OF THE INVENTION

According to the present invention, problems and disadvantages associated with previous techniques for accessing data in distributed software systems have been reduced or eliminated.

According to one embodiment, a method of providing data access in a distributed software system includes receiving from a client component a request for data associated with a server object of a server component. If the client component is local to the server component, the client component is allowed to directly access the server object data. If the client computer is remote from the server component, a proxy component provides the client component with local access to proxy object data corresponding to the requested server object data, the proxy component supporting one or more proxy objects each being a local copy of a corresponding server object. It is substantially transparent to the client component whether the server component is local to or remote from the client component.

According to another embodiment, a distributed software system includes at least one server component supporting one or more server objects having associated data and at least one client component that is distributed from the server component. The client component accesses data associated with one or more of the server objects according to a scheme that makes it substantially transparent to the client component whether the server component is local to or remote from the client component.

According to yet another embodiment, a client component is distributed from a server component supporting one or more server objects having associated data. The client component accesses data associated with one or more of the server objects according to a scheme that makes it substantially transparent to the client component whether the server component is local to or remote from the client component.

According to still another embodiment, a proxy component is within a first container that also contains a client component. The first container is remote from a second container containing a server component which supports one or more server objects having associated data, the client component being distributed from the server component. The proxy component supports one or more proxy objects that each provides a local version of a corresponding server object. The proxy component provides the client component with access to data associated with a proxy object in response to the client component requesting data associated with the corresponding server object, it being substantially transparent to the client component whether the server component is local to or remote from the client component.

Certain embodiments of the present invention may provide one or more technical advantages. The present invention may make it substantially transparent to client components whether the client-server interface is local or remote. In one embodiment, client components assume that server components 22 are remote for purposes of fetching objects to be used. Client component code for these operations is preferably optimized for the remote case accordingly. For example, this might mean that client components fetch objects only as they are needed, rather than copying the entire server component data model, thereby reducing the volume of data transferred over an intervening network. Once the objects are fetched, however, client components may properly assume that the objects are local for purposes of getting the objects and accessing their data. Client component code for these operations is preferably optimized for the local case accordingly. The server component programmer preferably handles the details of the local/remote dichotomy, removing client components and their programmers from considerations related to detecting whether server components 22 are local or remote. For example, the server component programmer may determine how data reconciliation and proxy data management are to be handled, such that neither client components nor their programmers need to deal with such issues. Thus, client component code may be developed using a constant set of assumptions that are appropriate whether client components are actually remote from or local to server components. This may greatly simplify the coding task for client components, reducing development costs while improving reliability.

BRIEF DESCRIPTION OF THE DRAWINGS

To provide a more complete understanding of the present invention and features and advantages thereof, reference is now made to the following description in conjunction with the accompanying drawings, in which.

DETAILED DESCRIPTION OF THE INVENTION

The following description includes references to particular exemplary systems. For example, the present invention is primarily described in the context of an object-oriented system. However, those skilled in the art will appreciate that the present invention similarly encompasses systems which are not object-oriented or are only partially object-oriented.

Figure 1:
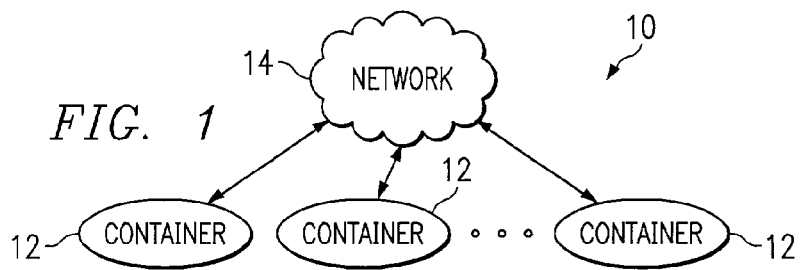
FIG. 1 illustrates an exemplary distributed software system.

FIG. 1 illustrates an exemplary distributed software system 10 including multiple containers 12 coupled to one another using a network 14. Each container 12 may be an executable or other suitable software object operating on an appropriate computer system. Although containers 12 are primarily described as operating on separate computer systems that are physically distributed from one another, multiple containers 12 may operate on a single computer system in a logically distributed manner according to the particular implementation. Each container 12 may contain one or more components. A particular component may be, with respect to another component within the same or a different container 12, either a client or a server. Some components may be implemented such that they are always either clients or servers, but the general case allows a component to be either a server or a client in the context of a particular relationship with another component.

The computer systems on which the containers 12 and their components are supported may include suitable input devices, output devices, mass storage media, processors, memory, or other resources for processing, storing, and communicating information according to the operation of system 10. As used in this document, the term "computer" is meant to encompass a personal computer, workstation, network computer, wireless data port, wireless telephone, personal digital assistant, one or more microprocessors within these or other suitable devices, or any other suitable processing device. The network 18 may include one or more local area networks (LANs), metropolitan area networks (MANs), wide area networks (WANs), at least some portion of the global computer network known as the Internet, or any other appropriate wireline, wireless, or other links.

Figure 2:
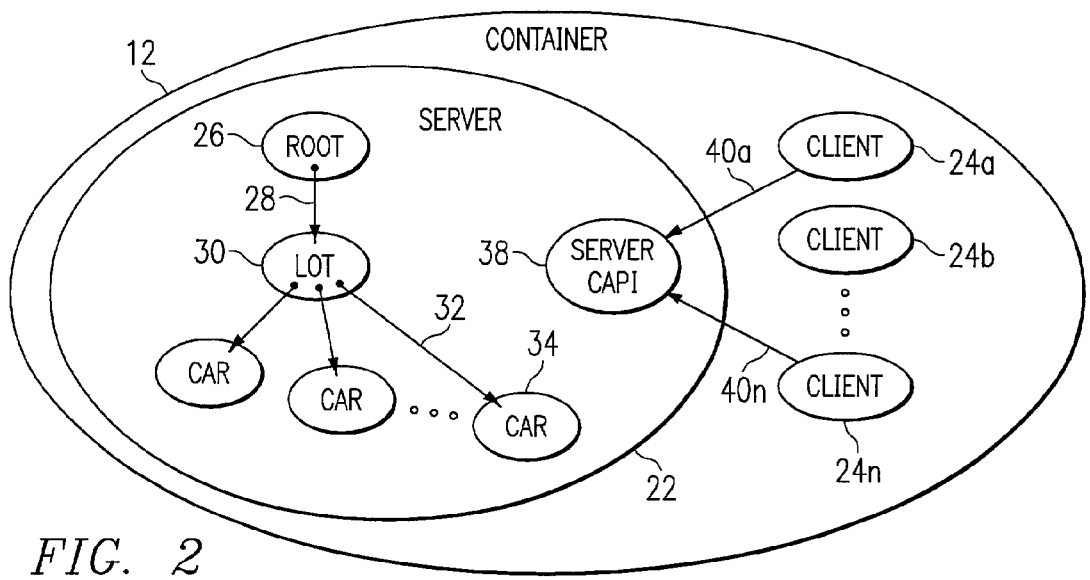
FIG. 2 illustrates exemplary client and server components having local relationships.

FIG. 2 illustrates exemplary client and server components having local relationships, in this case within a particular container 12. As shown, a server component 22 may have a client-server relationship with one or more client components 24. Similarly, although not shown for the sake of simplicity, a client component 24 may have a client-server relationship with one or more server components 22. At another time, server component 22 might have a different relationship with one or more client components 24 such that the server and client functions, respectively, were exchanged between the components. Those skilled in the art will appreciate that this description would similarly apply to these components in their different roles. Although a single exemplary server component 22 is shown along with exemplary client components 24, container 12 may include any suitable components according to particular needs. Moreover, although components 22 and 24 are described as residing within a container 12, components 22 and 24 may be associated with any suitable software structure or structures as appropriate.

In the present example, server component 22 incorporates a data model and its associated operations. In the particular example shown, the data model relates to a parking lot having multiple cars, although server component 22 may support any suitable data model without departing from the intended scope of the present invention. The data model includes a root object 26, which is the base object for the data model. Root object 26 may contain pointers 28 to one or more parking lot objects 30, only one of which is shown in FIG. 2 for purposes of simplicity. Similarly, parking lot object 30 may include pointers 32 to one or more car objects 34, which represent cars in the parking lot. In one embodiment, root object 26, parking lot objects 30, and car objects 34 are related through inheritance. Certain data concerning these objects, and certain methods or other operations to be performed with respect to the objects, are contained within the objects.

In one embodiment, server component 22 provides a client application program interface (CAPI) 38, which client components 24 use to access the data model of server component 22. As described more fully below with reference to FIGS. 4 and 5, remote client components 24 may access a proxy CAPI that presents the remote client components 24 with substantially the same, and preferably the identical, interface that server CAPI 38 presents to local client components 24. According to the present invention, it is substantially (and preferably completely) transparent to a client component 24 whether its relationship with a server component 22 is local or remote.

In one embodiment, to access an object in the data model of server component 22, a first local client component 24*a* sends a fetch or other suitable request 40*a* to server CAPI 38 for a particular server object, in this example a parking lot object 30. The availability of this fetch operation contributes to the client-server interface being consistent between the local and remote cases. As described below with reference to FIGS. 4 and 5, the fetch operation may actually only result in processing by CAPI 38 in the remote case. For the local case, described here, the fetch operation may be a "no-op" that results in little or no processing by server CAPI 38. Client component 24*a* then sends a get or other suitable request (not shown) to CAPI 38 to obtain a reference to the desired parking lot object 30. Server CAPI 38 can return this reference at least in part because server CAPI 38 contains a reference to root object 26. The returned reference is preferably in the form of a pointer to the interface base class of parking lot object 30.

If a second client component 24n desires to access the same parking lot object 30, it similarly begins by sending a fetch or other suitable request 40n to server CAPI 38 for the particular server object 30. This fetch operation may be a no-op as described above. Client component 24n also sends a get or other suitable request (not shown) to server CAPI 38 to obtain a pointer or other reference to parking lot object 30. Both client components 24 may subsequently access parking lot object 30 directly using the references obtained from server CAPI 38.

When a client component 24 wishes to access a car object 34, the client component 24 sends a fetch or other suitable request (not shown) for the desired car object 34 to server CAPI 38, preferably along with a reference to the particular parking lot object 30 through which the desired car object 34 can be obtained. As discussed above, the fetch operation may be a no-op. Client component 24 then sends a get or other suitable request (not shown) to the appropriate parking lot object 30 and obtains a reference to the desired car object 34, preferably in the form of a pointer to the interface base class for the car object 34.

Figure 3:
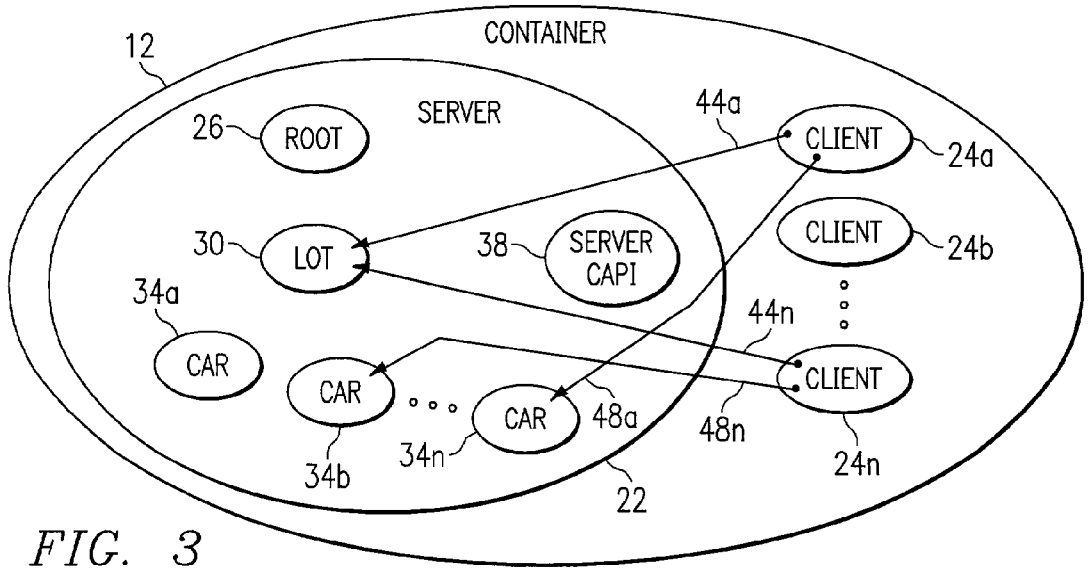
FIG. 3 illustrates exemplary accessing of a server component by one or more client components having local relationships with the server component.

FIG. 3 illustrates exemplary accessing of server component 22 by one or more client components 24 having local relationships with the server component 22. Once an object has been fetched for a client component 24, the object may be directly accessed by the client component 24 using a corresponding local pointer or other reference. For example, one or more client components 24 may each have a local pointer 44 to parking lot object 30 and local pointers 48 to one or more car objects 34. In the example of FIG. 3, component 24a has a local pointer 44a to server object 30 and a local pointer 48a to car object 34n, while component 24n has a local pointer 44n to server object 30 and a local pointer 48n to car object 34b. These car objects 34 may be accessed locally, using corresponding pointers 48, in a conventional or other suitable manner.

In one embodiment, a single fetch operation may be used to fetch multiple objects. For example, rather than simply fetching a single car object 34, a fetch operation can be used to substantially simultaneously fetch all car objects 34 associated with a particular parking lot object 30, all car objects 34 associated with a particular level object (not shown) representing a particular level of a multiple story parking garage, or any other suitable group of objects defined by the implementation of server component 22. As described below, fetching multiple objects at once may make data access more efficient, especially where server component 22 and client component 24 do not have a local relationship with one another. Because client component 24 may not know whether server component 22 is local or remote, in one embodiment client component 24 makes a default assumption that server component 22 is remote and employs such fetch optimizations accordingly. In contrast, a get operation may typically only return a single pointer or other reference. In one embodiment, get operations are always local in nature according to the present invention, such that it may not be as desirable to get multiple objects using a single operation. In this case, each get request returns exactly one reference to an object, the reference having a type corresponding to the object that is the subject of the get request.

Figure 4:
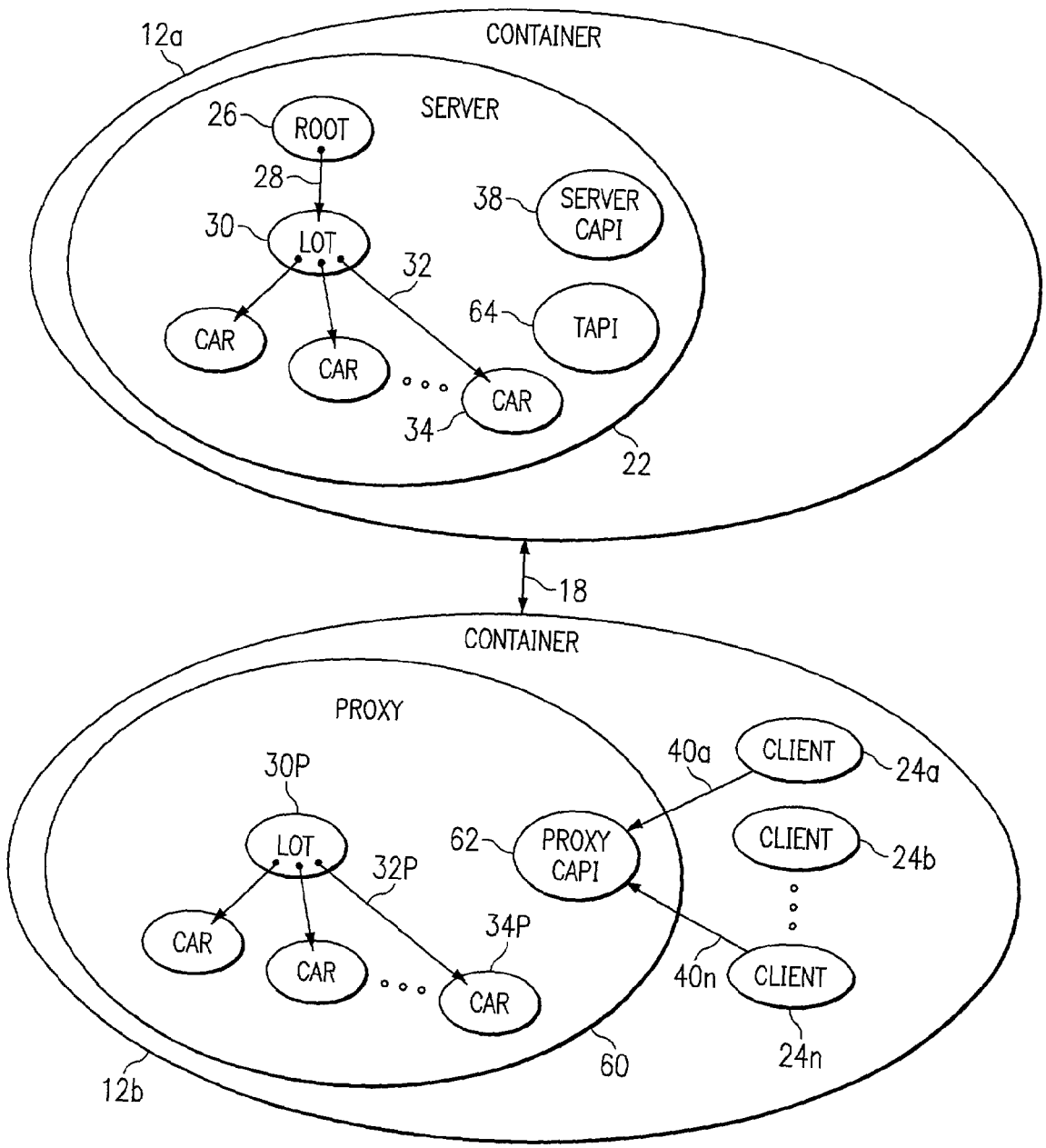
FIG. 4 illustrates exemplary client and server components having remote relationships.

FIG. 4 illustrates exemplary client and server components having remote relationships. In one embodiment, from the perspective of client components 24, operation in the remote case is identical to that of the local case. Although additional activities are performed in the remote case, these activities are preferably wholly or at least partially transparent to client components 24. In the example of FIG. 4, server component 22 is associated with a first container 12a, while client components 24 are associated with a second container 12b that is remote from first container 12a. However, one or more local client components 24 and one or more remote client components 24 may access the data model of server component 22 substantially simultaneously. A proxy component 60 has been loaded and initialized in container 12b of client components 24. Although a single proxy component 60 may serve all client components 24 within container 12b, the present invention contemplates multiple proxy components 60 according to particular needs. Loading and initialization of proxy component 60 may be arranged when container 12b is initialized, when a first reference is made to server component 22 by any client component 24 in container 12b, or otherwise.

In one embodiment, when initialized, proxy component 60 contains a proxy CAPI 62 that client components 24 use instead of server CAPI 38 to access the data model of server component 22. In one embodiment, from the perspective of client components 24, proxy CAPI 62 and server CAPI 38 present substantially similar and preferably identical interfaces. However, proxy CAPI 62 is able to communicate remotely with server component 22, preferably in a manner that has been optimized for such remote communications. When proxy CAPI 62 is created within proxy component 60, a corresponding transport API (TAPI) 64 may be created within server component 22 to communicate with proxy CAPI 62. In a particular embodiment, TAPI 64 provides a Common Object Request Broker Architecture (CORBA) interface. A suitable connection is established between proxy CAPI 62 and TAPI 64 using network 18.

A client component 24 sends a "fetch" or other suitable request 40 to proxy CAPI 62 for, in this example, a parking lot server object 30. This fetch request 40 is preferably the same as fetch request 40 made to server CAPI 38 in the local case described above. However, in one embodiment, in the remote case proxy CAPI 62 invokes a corresponding fetch operation associated with (or otherwise passes the fetch request 40 to) TAPI 64 of server component 22. In response, TAPI 64 requests one or more parking lot objects 30 from root object 26 of server component 22. If only a single parking lot object 30 is to be accessed at this time, preferably only that parking lot object 30 is requested in order to minimize data transfer over network 18 between containers 12a and 12b. A state object (not shown) corresponding to the requested parking lot object 30 is constructed and TAPI 64 returns the state object to proxy CAPI 62. If multiple objects are being fetched, multiple corresponding state objects are constructed and returned. Using the information returned in such state objects, proxy CAPI 62 constructs client side proxy objects corresponding to the server objects being fetched. For example, proxy object 30P might correspond to server object 30. The state objects preferably contain all the information necessary to construct proxy objects that are identical to their corresponding server objects. In one embodiment, the fetch procedure is similar to that of the local case, and is preferably identical from the perspective of client component 24, except that proxy objects are actually constructed as opposed to the no-op that occurs in the local case.

Once the proxy objects have been constructed, the fetch operation returns to the client component 24. Client component 24 sends a get or other suitable request (not shown)

to proxy CAPI 62 to obtain references to the proxy objects. References to a proxy object may be in the form of a local pointer, just as in the local case, allowing client component 24 to make a direct interface call to the object interface for the proxy object. Continuing the particular example, once parking lot proxy object 30P has been fetched and an appropriate get request performed, additional fetch requests 40 for one or more car objects 34P may be sent to proxy CAPI 62. Each such request preferably contains a reference to the particular parking lot object 30P through which the corresponding car object 32P can be obtained, as in the local case described above.

Each fetch request 40 made to proxy CAPI 62 causes a corresponding fetch operation to be invoked on (or is otherwise passed to) TAPI 64, which then requests one or more appropriate objects from server component 22. State objects of the appropriate type are constructed and transported back to proxy CAPI 62, which constructs the appropriate proxy objects. When a car object 34 is fetched by client component 24, for example, a state object of the appropriate type is constructed and transported back to proxy CAPI 62, which constructs the appropriate car object 34P. As described above, after the fetch operation is performed, client component 24 sends a get or other suitable request to proxy parking lot object 30P to obtain references to the individual proxy car objects 34P. When a proxy car object 34P is requested, the returned reference may be in the form of a pointer to the interface base class of the requested proxy car object 34P. Client component 24 can then make direct interface calls to the object interface for proxy car object 34P.

Figure 5:
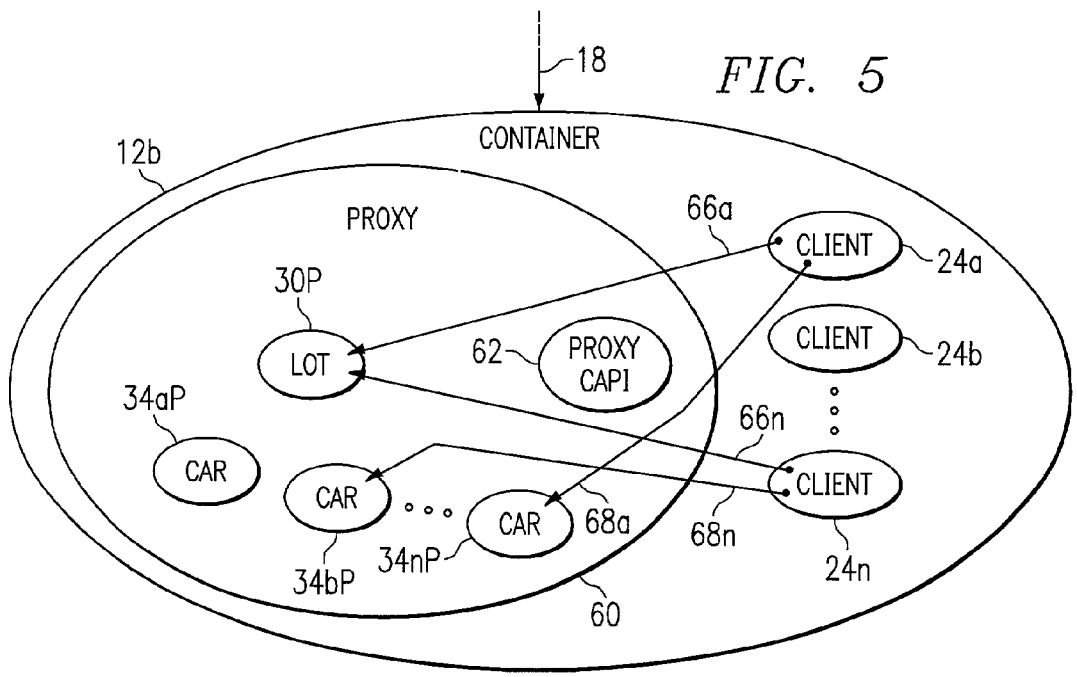
FIG. 5 illustrates exemplary accessing of a server component, using a proxy component, by one or more client components having remote relationships with the server component.

In one embodiment, from the perspective of the client component 24, the procedure for fetching and getting objects is substantially the same if not identical whether server component 22 is local to or remote from client component 24. When server component 22 is remote, local copies of the requested objects are constructed within proxy component 60. Once they are constructed within proxy component 60, these proxy objects may be accessed by client component 24 in the same manner as if server component 22 was local to client component 24. FIG. 5 illustrates an example of pointers or other references being used by client components 24 to access proxy objects within proxy component 60. In this example, client component 24a has obtained pointers 66a and 68a to parking lot object 30P and car object 34nP, respectively, while client component 24n has obtained pointers 66n and 68n to parking lot object 30P and car object 34bP, respectively.

In one embodiment, for purposes of fetching objects from server component 22, the client components 24 are coded and optimized as if server component 22 is always remote. This means that in the remote case, for optimal process execution, preferably only objects that are actually needed by client components 24 are fetched. The portion of the data model of server component 22 that is copied into proxy component 60 will often therefore be incomplete and the overhead associated with copying the entire data model to proxy component 60 will be avoided. In instances where a significant portion of the data model does need to be copied to proxy component 60, that portion of the data model may be copied in several smaller pieces. This will tend to prevent network 18 from being overloaded with an unusually large data transfer. In contrast, for purposes of getting objects from server component 22 and accessing associated data, client components 24 are coded and optimized as if server component 22 is always local. As described above, when server component 22 is local to client component 24, fetches may have no effect (no-ops) such that data transfer considerations are of little or no concern. Because all objects are accessed using local references, in both the local and remote cases, client component code for accessing data may be optimized as appropriate for the local case.

As is typically the case when copies of data reside in multiple locations, use of the present invention may give rise to issues of data coherency and synchronization between server objects and their corresponding proxy objects. Depending on the implementation, it may be necessary or desirable to substantially immediately reflect all changes to proxy objects back to their corresponding server objects. Techniques selected for processing such updates, if they are allowed or required, will depend on the particular implementation.

Figure 6:
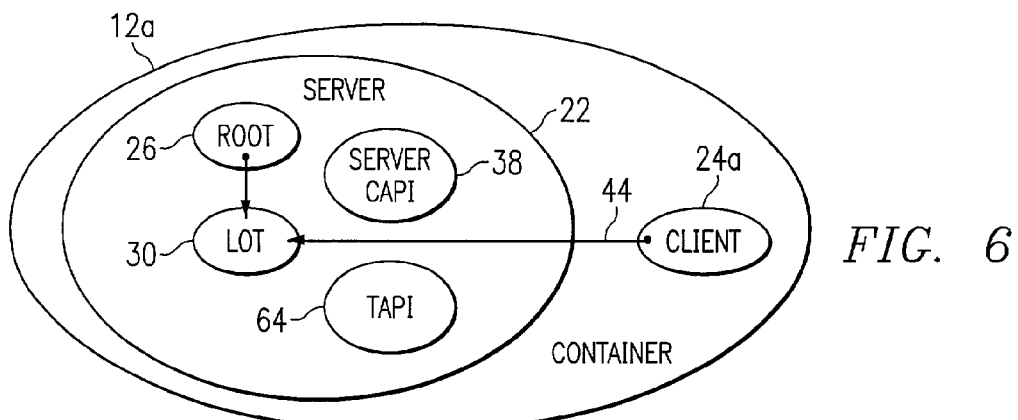
FIG. 6 illustrates exemplary data reconciliation.
Figure 6:
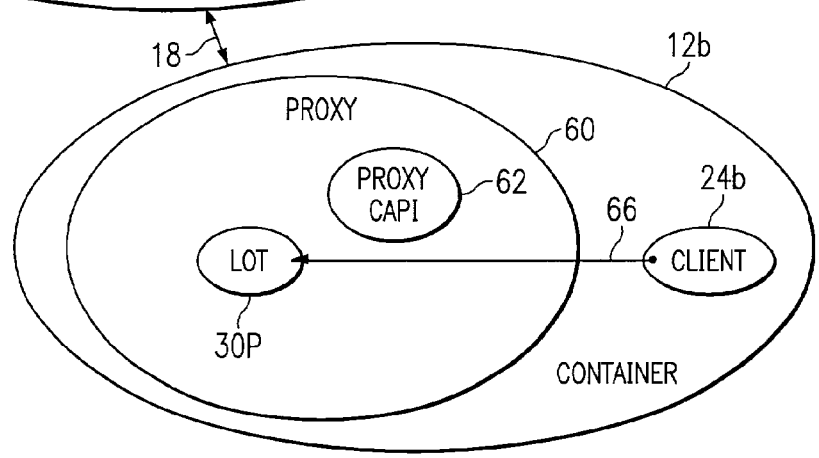

FIG. 6 illustrates exemplary data reconciliation. Exemplary container 12a includes a client component 24a and a server component 22 in a local relationship. Server component 22 includes server CAPI 38 and TAPI 64 as described above. Server objects other than root object 26 and parking lot object 30 are omitted for simplicity. Client component 24a has obtained a reference 44 to parking lot object 30. When client component 24a makes a change to parking lot object 30, such change is substantially immediately reflected in the associated data within server component 22.

Exemplary container 12b contains a client component 24b and a proxy component 60. Proxy component 60 includes a proxy CAPI 62 and has established a proxy parking lot object 30P. Proxy objects other than proxy parking lot object 30P are omitted for simplicity. Client component 24b has obtained a reference 66 to proxy parking lot object 30P. When client component 24b makes a change to proxy object 30P, the state of the proxy object will become different from that of the corresponding parking lot object 30 and also that of any other proxy parking lot objects 30P within the same or other containers 12. However, it is generally necessary or at a minimum desirable to ensure that server component 22 and all proxy components 60 have the same data.

Management of updates can be performed in any suitable manner depending on the requirements of the particular application. The present invention provides a mechanism for sending updates back to a server object from one or more corresponding proxy objects. A mechanism is also provided for pushing updates from server component 22 to one or more proxy components 60 to reconcile the server object with all of its corresponding proxy objects. The management scheme for determining whether to update objects, and when, is typically the responsibility of the server component programmer and depends on the particular implementation.

In one embodiment, to implement a complete data reconciliation scheme, four types of methods or other operations may be required. First is the fetch operation previously discussed. In addition to being used to initially send one or more objects to a proxy component 60 from a server component 22, this operation can be used by server component 22 to update an object that already exists within proxy component 60. Because data in the proxy component 60 may be shared by one or more client components 24, in a push situation care should be taken to preserve data integrity during the course of any transactions that may already be underway involving these client components 24.

Additional operations may include send, release, and reconcile operations. The send operation is used by proxy component 60 to transport data back to server component 22. Depending on the implementation, proxy component 60 may require appropriate privileges to update or otherwise change a server object contained in server component 22.

The release operation is the complement to the fetch operation, releasing references to proxy objects by client component 24. This operation is used by client component 24 to "clean up" after it is through using the proxy objects. Of course, if client component 24 happens to be local to the server object, no activities may actually be performed in connection with a fetch operation. When client component 24 is remote, however, the release operation is used to adjust reference counts within the proxy object as described below. If the reference count for a released proxy object reaches zero, server component 22 can be notified that this particular proxy object is no longer valid. The reconcile method is approximately equivalent to a combined send and fetch operation. It is used to reconcile all changes between the proxy and server objects. Priority of reconciliation in the event of changes in both objects will depend on the particular implementation. Possibilities may include always accepting proxy object updates, accepting only changes made within server component 22 and ignoring proxy object updates, and updating to the change having the latest time stamp. Other suitable updating schemes may be appropriate.

Updating of multiple proxy objects is also implementation dependent, and is an extension of the above techniques. In most cases, the possibility of multiple proxy objects will require limitations on changes that can be made by client components 24. When a client component 24 does update a server object, the changes may also need to be propagated to all of the corresponding proxy objects. If so, server component 22 may need to track all of the outstanding proxy objects which need updating in order to perform fetch or reconcile operations on them, as appropriate. Proper use of the release operation by client components 24 allows this to be readily tracked.

Because a client component 24 may not know whether server component 22 is local or remote, in one embodiment the assumption is made that server component 22 is remote. In that case, all client components 24 release all objects that have been fetched by these client components 24. Since this generally happens dynamically, it may not be possible for a syntax checker to ensure that all fetched objects have been released. However, a release all operation can be used by client component 24 to "clean up" after use of the proxy objects is complete. As described more fully below, this operation may be applied by proxy component 60 to an entire table of reference identifiers to enable the table to be updated.

Managing proxy objects within proxy component 60 can be problematic for several reasons. First, when a client component 24 requires a server object, in many situations it may be difficult to determine whether the server object has previously been fetched. Redundant fetching is undesirable for performance reasons. Second, it is possible for proxy component 60 to support multiple client components 24, each of which require objects from the server component data model. Normally, if an object is fetched multiple times and multiple pointers or other references to the object exist within client components 24, then when the corresponding proxy object is deleted it may be difficult to find all references to it and invalidate them. For these reasons, an indexing scheme is preferably employed within proxy component 60.

Figure 7:
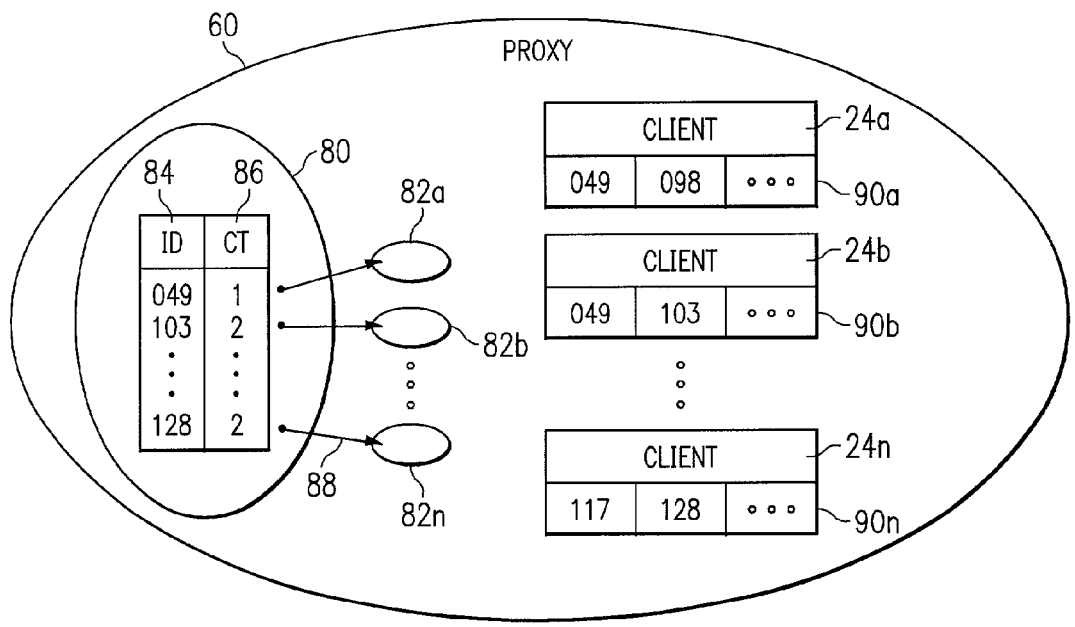
FIG. 7 illustrates exemplary proxy object management.

FIG. 7 illustrates exemplary proxy object management. In general, the approach of the present invention is to utilize reference counts for all objects that are fetched from server component 22 such that each proxy component 60 has at most one copy of any object fetched from the server component 22. In one embodiment, proxy component 60 includes an index class object 80 that is used to reference the proxy objects 82 established in proxy component 60. Index class object 80 contains an identifier 84 for each proxy object 82, a reference count 86 of the number of client components 24 that reference proxy object 82, and a pointer 88 to proxy object 82. In FIG. 7, exemplary proxy objects 82a, 82b, and 82 are identified by "049," "103," and "128" identifiers 84, respectively. Identifiers 84 may be organized into one or more arrays 90 each corresponding to a single client component 24 and containing identifiers 84 for proxy objects 82 that have been fetched by that client component 24.

The reference count 86 for a proxy object 82 is incremented each time client component 24 issues a fetch request 40 for proxy object 82. In one embodiment, the fetch request 40 is only passed to TAPI 74 if proxy object 82 does not already exist within proxy component 60. If proxy object 82 already exists within proxy component 60, subsequent fetch requests 40 simply increment the reference count 86 for proxy object 82. When a release operation is issued by a client component 24 with respect to a proxy object 82, reference count 86 for that proxy object 82 is decremented accordingly. When reference count 86 for a proxy object 82 reaches zero, proxy object 82 is deleted from the address space of proxy component 60.

Index class object 80 preferably maintains a single pointer or other reference 88 to each proxy object 82. This reference 88 (which may be assigned according to the server component data model or in any other suitable manner) is used as the key into the index. In one embodiment, proxy objects 82 do not contain references 88 to other proxy objects 82, instead keeping copies of identifiers 84 for other proxy objects 82 and using index class object 80 to locate the other proxy objects 82.

Client components 24 access proxy objects 82 using references as described above. All client components 24 in a container 12 may share the same index to obtain references to the indexed proxy objects 82. Although client component 24 may at any given time maintain multiple references to a proxy object 82 (obtained from index class object 80 or otherwise), index class object 80 and the proxy management code preferably maintain only one such reference 88 are described above. Assuming that client component programmers do not allow client components 24 to initiate the release operation until all their references to a proxy object 82 are removed, proper integrity is maintained.

In one embodiment, the consistent view of the server objects and their corresponding proxy objects that is provided to client components 24 is enforced by an inheritance mechanism. The server component programmer codes server component 22 and preferably provides a set of classes that make proxy creation and manipulation wholly or partially transparent to client components 24 and thus to client component programmers. In a particular embodiment, the server component programmer creates a set of templatized classes according to an automated process, the templatized classes being customized for the particular server component 22, and makes this set of templatized classes available to programmers of client components 24 that are to interact with server component 22.

Although in the local case client components 24 have direct access to objects in the server component data model, for several reasons it is generally undesirable to give client components 24 full access to all internals of a server object. First, certain data or operations may represent server component functionality having semantics that are unknown to client components 24 and should not be accessed or initiated, respectively, by client components 24. Second, portions of a data model implementation may include fields used for internal calculations or other purposes that are of no interest to client components 24. Third, since the preferred embodiment provides an identical client-server interface (from the perspective of client components 24) for both the local and remote cases, if an operation is available in the local case it should also be available in the remote case. Therefore, although local client components 24 have direct access to objects in the server component data model, local client components 24 preferably only have access to that portion of the data model to which remote client components 24 also have access.

Figure 8:
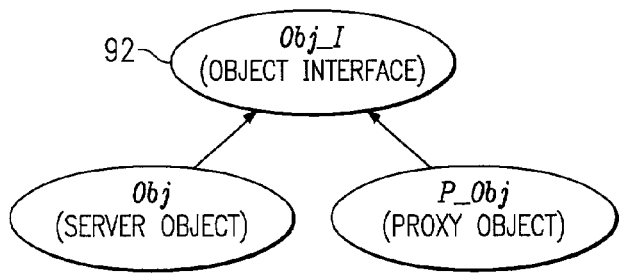
FIG. 8 illustrates exemplary inheritance relationships for objects.

FIG. 8 illustrates exemplary inheritance relationships for objects used within the system 10. A common interface base class 92 may be constructed for all objects to represent the entire view of an object that is exposed to client components 24 in both the local and remote cases. Both a server object and its corresponding proxy object are preferably derived from this base class 92. Use of base class 92 contributes to local/remote client-server interface transparency, since both the server object and its corresponding proxy object appear identical to client components 24. Furthermore, since remote communication of some or all of a data model involves a transportation process (i.e. transporting the state of the server object from server component 22 to proxy component 60 in order to create the corresponding proxy object), a state class is preferably created which includes state information suitable for such transportation. The proxy object may then be derived from the state class and constructed using that state information.

Figure 9:
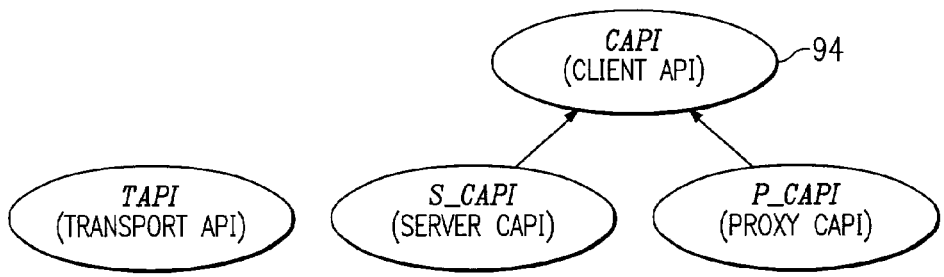
FIG. 9 illustrates exemplary inheritance relationships for object interfaces.

FIG. 9 illustrates exemplary inheritance relationships for APIs used within system 10. A common interface base class 94 may be constructed for all CAPIs 38 and 62 to represent the entire view of CAPIs 38 and 62 that is exposed to client components 24 in both the local and remote cases. As shown, both server CAPI 38 and proxy CAPI 62 are preferably derived from this base class 94. Similar to base class 92 described above, use of the base class 94 contributes to local/remote client-server interface transparency, since both the server CAPI 38 and its corresponding proxy CAPI 62 appear identical to client components 24. As shown, TAPI 64 need not be derived from any other class.

As described above, the present invention makes it substantially transparent to client components 24 whether the client-server interface is local or remote. In one embodiment, client components 24 assume that server components 22 are remote for purposes of fetching objects to be used. Client component code for these operations is preferably optimized for the remote case accordingly. For example, this might mean that client components 24 fetch objects only as they are needed, rather than copying the entire server component data model, thereby reducing the volume of data transferred over network 18. Once the objects are fetched, however, client components 24 may properly assume that the objects are local for purposes of getting the objects and accessing their data. Client component code for these operations is preferably optimized for the local case accordingly. The server component programmer preferably handles the details of the local/remote dichotomy, removing client components 24 and their programmers from considerations related to detecting whether server components 22 are local or remote. For example, the server component programmer may determine how data reconciliation and proxy data management is to be handled, such that neither client components 24 nor their programmers need to deal with such issues. Thus, client component code may be developed using a constant set of assumptions that are appropriate whether client components 24 are actually remote from or local to server components 22. This may greatly simplify the coding task for client components 24, reducing development costs while improving reliability.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A component-based distributed software system, the system comprising one or more computer systems each comprising one or more processing units and one or more memory units, the system comprising:
   a first container comprising:
      at least one server component capable of having a client-server relationship with one or more client components;
      one or more server objects having associated data and capable of being supported by the at least one server object; and
      one or more client components which are local to the at least one server component;
      wherein the first container is capable of containing more than one server component, more then one server object, and more than one client component; and
   a second container comprising at least one proxy component, one or more proxy objects capable of being supported by the at least one server object, and one or more client components capable of having a client-server relationship with one or more server components, the one or more client components are remote and distributed from the at least one server component, wherein the second container is capable of containing more than one proxy component, more than one proxy object, and more than one client component, and operable to:
      access data associated with one or more of the server objects such that whether the server component is local to or remote from the client component is substantially transparent to the client component;
      if the server component is local to the client component, in order to access server object data, execute data access operations optimized for local communications; and
      if the server component is remote from the client component, in order to access server object data, access at least one proxy component that is:
         within the second container;
         supporting one or more proxy objects each providing a local version of a corresponding server object: and
         operable to:
            provide the client component with access to data associated with a proxy object in response to the client component requesting data associated with the corresponding server object;
            execute data access operations optimized for remote communications to access data associated with the corresponding server object; and substantially immediately reflect all changes to data associated with the proxy objects back to data associated with the corresponding server objects.

2. The system of claim 1, wherein the client component is allowed to use the same operations to access server object data whether the client component is local to or remote from the server component.

3. The system of claim 1, wherein the client component is operable to access server object data without determining whether the client component is local to or remote from the server component.

4. The system of claim 1, wherein the client component is coded as if the client component will always be remote from any associated server component and all communications to such a server component will be remote communications.

5. The system of claim 1, wherein the client component has been developed using templatized code appropriate for multiple client components of the server component, such that local and remote client-server interface transparency is preserved across all such client components and repetitive code generation has been minimized in developing such client components.

6. The system of claim 1, wherein the proxy component is operable to perform management tasks relating to the proxy objects.

7. The system of claim 1, wherein the proxy component is a generic component customized by a developer of the server component.

8. The system of claim 1, wherein the proxy component and the server component are operable to cooperate to reconcile proxy object data with server object data, using one or more operations, in a manner consistent with local and remote client-server interface transparency.

9. A component-based distributed software system, the system comprising one or more computer systems each comprising one or more processing units and one or more memory units, the system comprising:
a first container comprising:
at least one server component capable of having a client-server relationship with one or more client components;
one or more server objects having associated data and capable of being supported by the at least one server object; and
one or more client components which are local to the at least one server component;
wherein the first container is capable of containing more than one server component, more then one server object, and more than one client component; and
a second container comprising at least one proxy component, one or more proxy objects capable of being supported by the at least one server object, and one or more client components capable of having a client-server relationship with one or more server components, the one or more client components are remote and distributed from the at least one server component, wherein the second container is capable of containing more than one proxy component, more than one proxy object, and more than one client component, and operable to:
access data associated with one or more of the server objects according to a scheme allowing the client component to use the same operations to access server object data whether the client component is local to or remote from the server component;
if the server component is local to the s client component, in order to access server object data, execute data access operations optimized for local communications; and
if the server component is remote from the client component, in order to access server object data, access at least one proxy component that is:
within the second container;
supporting one or more proxy objects each providing a local version of a corresponding server object; and
operable to:
provide the client component with access to data associated with a proxy object in response to the client component requesting data associated with the corresponding server object;
execute data access operations optimized for remote communications to access data associated with the corresponding server object; and
substantially immediately reflect all changes to data associated with the proxy objects back to data associated with the corresponding server objects.

10. A component-based distributed software system, the system comprising one or more computer systems each comprising one or more processing units and one or more memory units, the system comprising:
a first container comprising:
at least one server component capable of having a client-server relationship with one or more client components;
one or more server objects having associated data and capable of being supported by the at least one server object; and
one or more client components which are local to the at least one server component;
wherein the first container is capable of containing more than one server component, more then one server object, and more than one client component; and
a second container comprising at least one proxy component, one or more proxy objects capable of being supported by the at least one server object, and one or more client components capable of having a client-server relationship with one or more server components, the one or more client components are remote and distributed from the at least one server component, wherein the second container is capable of containing more than one proxy component, more than one proxy object, and more than one client component, and operable to:
access data associated with one or more of the server objects, without determining whether the client component is local to or remote from the server component such that whether the server component is local to or remote from the client component is substantially transparent to the client component and such that the client component is allowed to use the same operations to access server object data whether the client component is local to or remote from the server component;
if the server component is local to the client component, in order to access server object data, execute data access operations optimized for local communications; and
if the server component is remote from the client component, in order to access server object data, access at least one proxy component supporting one or more proxy objects each providing a local version of a corresponding server object, the proxy component being within the second container and operable to:
provide the client component with access to data associated with a proxy object in response to the client component requesting data associated with the corresponding server object;
execute data access operations optimized for remote communications to access data associated with the corresponding server object; and
substantially immediately reflect all changes to data associated with the proxy objects back to data associated with the corresponding server objects.

11. A computer-implemented method of providing data access in a component-based distributed software system, the method performed using one or more computer systems each comprising one or more processing units and one or more memory units, the method comprising:
receiving a request from a client component, within a first container, for data that is associated with a server object of a server component, the first container is capable of containing more than one server component, more then one server object, and more than one client component;
if the client component is local to the server component, allowing the client component to directly access the requested server object data, the client component operable to execute data access operations optimized for local communications to access server object data;
if the client component is remote from the server component, using a proxy component to provide the client component with local access to proxy object data corresponding to the requested server object data, the proxy component supporting one or more proxy objects each being a local copy of a corresponding server object, the proxy component operable to execute data access operations optimized for remote communications to access data associated with the corresponding server object; and
substantially immediately reflect all changes to data associated with the proxy objects back to data associated with the corresponding server objects;
wherein whether the server component is local to or remote from the client component is substantially transparent to the client component.

12. The method of claim 11, further comprising allowing the client component to use the same operations to access server object data whether the client component is local to or remote from the server component.

13. The method of claim 11, further comprising allowing the client component to access server object data without determining whether the client component is local to or remote from the server component.

14. The method of claim 11, wherein the client component is coded as if the client component will always be remote from any associated server component and all communications to such a server component will be remote communications.

15. The method of claim 11, wherein the client component has been developed using templatized code appropriate for multiple client components of the server component, such that local and remote client-server interface transparency is preserved across all such client components and repetitive code generation has been minimized in developing such client components.

16. The method of claim 11, wherein the proxy component performs management tasks relating to the proxy objects.

17. The method of claim 11, wherein the proxy component is a generic component customized by a developer of the server component.

18. The method of claim 11, wherein the proxy component and the server component cooperate to reconcile proxy object data with server object data, using one or more operations, in a manner consistent with local and remote client-server interface transparency.

19. A computer-implemented method of providing data access in a component-based distributed software system, the method performed using one or more computer systems each comprising one or more processing units and one or more memory units, the method comprising:
receiving a request from a client component, within a first container, for data that is associated with a server object of a server component, the first container is capable of containing more than one server component, more then one server object, and more than one client component;
if the client component is local to the server component, allowing the client component to directly access the requested server object data, the client component operable to execute data access operations optimized for local communications to access server object;
if the client component is remote from the server component, using a proxy component to provide the client component with local access to proxy object data corresponding to the requested server object data, the proxy component supporting one or more proxy objects each being a local copy of a corresponding server object, the proxy component operable to execute data access operations optimized for remote communications to access data associated with the corresponding server object; and
substantially immediately reflect all changes to data associated with the proxy objects back to data associated with the corresponding server objects;
the client component using the same operations to access server object data whether the client component is local to or remote from the server component.

20. A computer-implemented method of providing data access in a component-based distributed software system, the method performed using one or more computer systems each comprising one or more processing units and one or more memory units, the method comprising:
receiving a request from a client component for data that is associated with a server object of a server component distributed from the client component, the server component being within a first container, the first container is capable of containing more than one proxy component, more than one proxy object, and more than one client component, and the client component being within a second container, the second container is capable of containing more than one server component, more then one server object, and more than one client component, the client component operable to execute data access operations optimized for local communications to access server object data;
if the client component is local to the server component, allowing the client component to directly access the requested server object data;
if the client component is remote from the server component, using a proxy component within the second container to provide the client component with local access to proxy object data corresponding to the requested server object data, the proxy component supporting one or more proxy objects each being a local version of a corresponding server object, the proxy component operable to execute data access operations optimized for remote communications to access data associated with the corresponding server object; and substantially immediately reflect all changes to data associated with the proxy objects back to data associated with the corresponding server objects;

wherein whether the server component is local to or remote from the client component is substantially transparent to the client component, the client component being able to use the same data access operations whether the client component is local to or remote from the server component.

21. A computer-implemented method of accessing data in a component-based distributed software system using a client component, the method performed using one or more computer systems each comprising one or more processing units and one or more memory units, the method comprising:

at the client component, within a first container that is capable of containing more than one server component, more then one server object, and more than one client component, accessing data associated with one or more server objects of a server component that is distributed from the client component, each server object having associated data, the client component accessing the server object data such that whether the server component is local to or remote from the client component is substantially transparent to the client component;

if the client component is local to the server component, allowing the client component to directly access the requested server object data, the client component operable to execute data access operations optimized for local communications to access data associated with one or more server objects;

if the client component is remote from the server component, using a proxy component to provide the client component with local access to proxy object data corresponding to the requested server object data, the proxy component supporting one or more proxy objects each being a local copy of a corresponding server object, the proxy component operable to execute data access operations optimized for remote communications to access the data associated with the corresponding server object; and substantially immediately reflect all changes to data associated with the proxy objects back to data associated with the corresponding server objects.

22. A computer-implemented method of providing data access in a component-based distributed software system using a proxy component, the proxy component operable to execute data access operations optimized for local communications, the proxy component being within a first container that also contains a client component and is remote from a second container, the first container is capable of containing more than one proxy component, more than one proxy object, and more than one client component, the second container contains a server component supporting one or more server objects having associated data, the second container is capable of containing more than one server component, more then one server object, and more than one client component, the client component being distributed from the server component and operable to execute data access operations optimized for local communications, the method performed using one or more computer systems each comprising one or more processing units and one or more memory units, the method comprising:

supporting one or more proxy objects each providing a local version of a corresponding server object;

providing the client component with access to data associated with a proxy object in response to the client component requesting data associated with the corresponding server object, such that whether the server component is local to or remote from the client component is substantially transparent to the client component and such that data access operations optimized for remote communications are performed when the client component is remote from the server component and data access operations optimized for local communications are performed when the client component is local to the server component; and substantially immediately reflect all changes to data associated with the proxy objects back to data associated with the corresponding server objects.

* * * * *